Jan. 23, 1934.  G. L. PARRISH  1,944,524
GUIDING ATTACHMENT FOR BAND SAWS
Filed Nov. 10, 1932  2 Sheets-Sheet 2
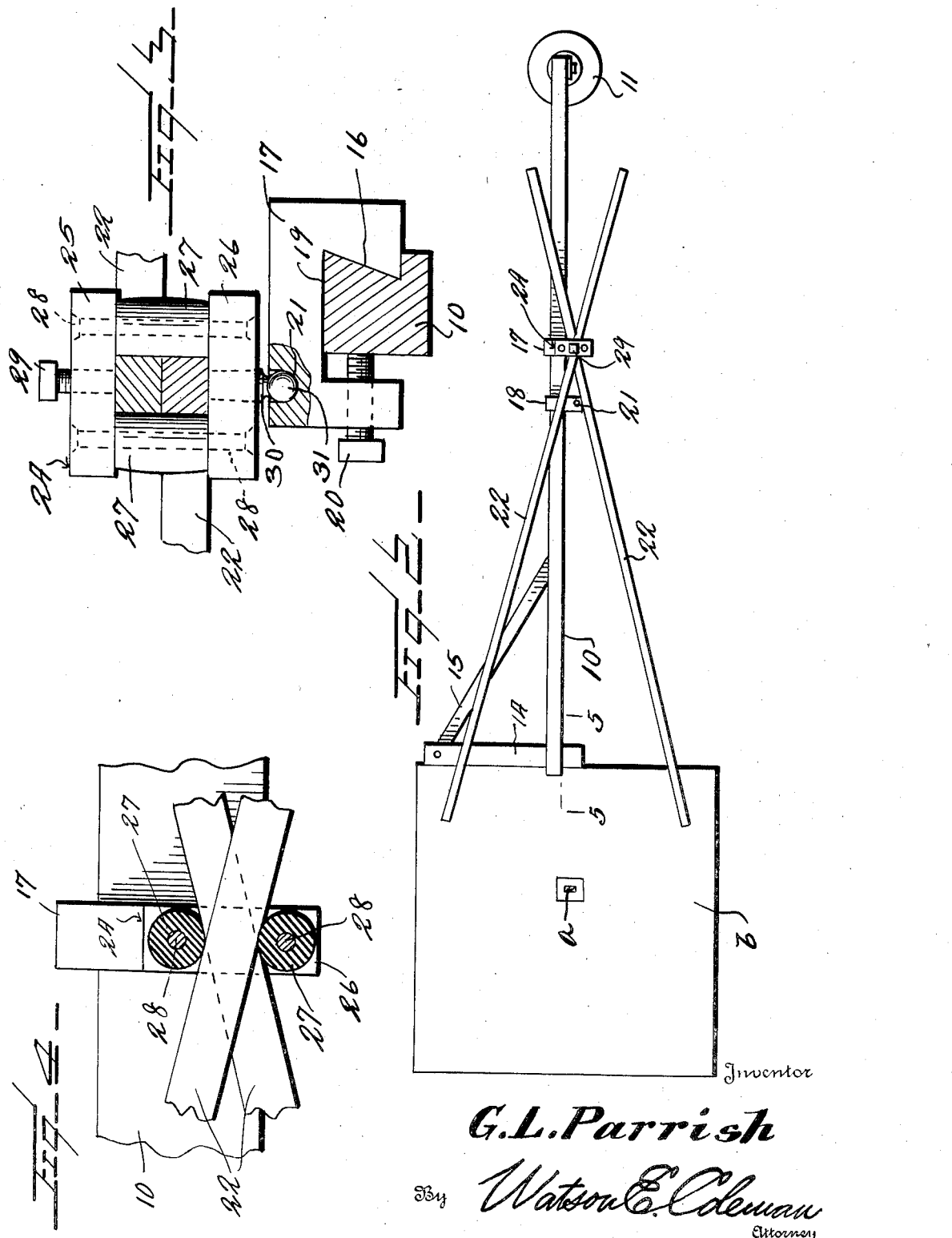
Inventor
G. L. Parrish
By Watson E. Coleman
Attorney Patented Jan. 23, 1934

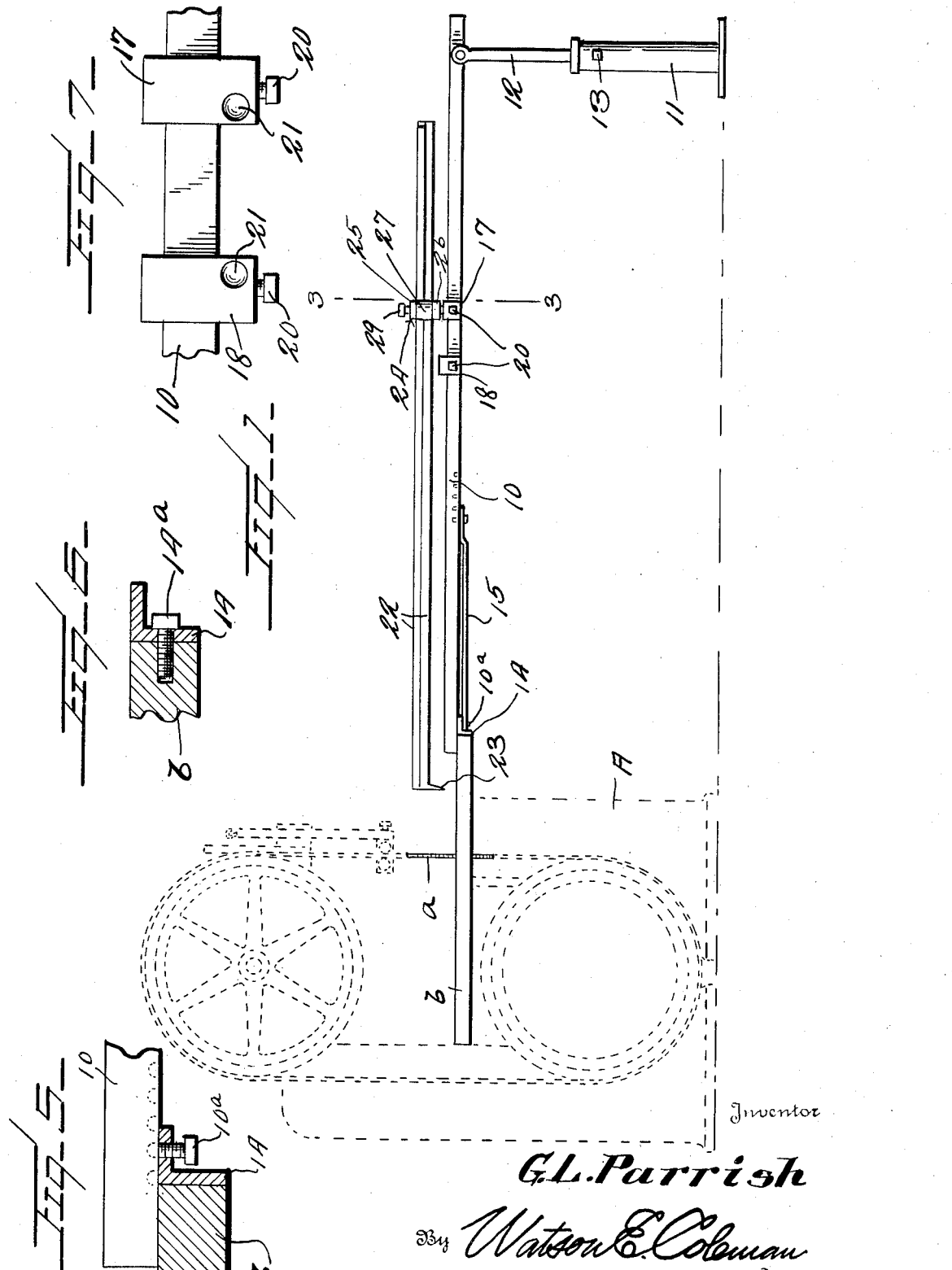

1,944,524

UNITED STATES PATENT OFFICE 1,944,524

GUIDING ATTACHMENT FOR BAND SAWS

George L. Parrish, Williamsport, Pa., assignor of one-half to George Herrick, Williamsport, Pa.

Application November 10, 1932
Serial No. 642,120

4 Claims. (Cl. 143—171)

This invention relates to devices for use in connection with band saws for sawing material in a circle or on a radius and the general object of the invention is to provide an attachment which will permit the sawing of the material in a circle without the use of patterns or indicating marks.

A further object in this connection is to provide an attachment of this character which is very simple and which can be used for causing the work to move in the arc of a circle with reference to the band saw and a further object in this connection is to provide means whereby the attachment may be adjusted to saw an arc of any desired radius within the range of the attachment.

Other objects will appear in the course of the following description.

My invention is illustrated in the accompanying drawings, wherein:—

Figure 1 is a side elevation of my improved guiding attachment showing the saw in dotted lines;

Figure 2 is a top plan view of the structure shown in Figure 1;

Figure 3 is a section on the line 3—3 of Figure 1;

Figure 4 is a top plan view of the support and the intersecting bars, the elastic cushions being shown in section.

Figure 5 is a fragmentary section on the line 5—5 of Figure 2;

Figure 6 is a fragmentary section through the angle iron showing the manner in which it is held upon the table;

Figure 7 is a fragmentary top plan view of a portion of the supporting bar and two slides.

Referring to these drawings, A designates the frame of the usual band saw, $a$ being the saw itself and $b$ the table upon which the work is disposed for sawing. My attachment includes a metal bar or rod designated 10 which may have any desired length. This bar at one end is level with and/or rests on top of the table $b$ at the edge thereof. The other end of the bar is supported by any suitable adjustable support illustrated in the present instance as a base 11 resting upon the floor and having a telescopic extension 12 which may be raised or lowered within the base so as to support the bar 10 in a truly horizontal position. This extension 12 may be held in its adjusted position by a set screw 13 or any other suitable means. Preferably there will be provided in connection with the bar 10 the angle iron cross bar 14 attached to the saw table $b$ in any suitable manner and having a brace 15 extending to the bar 10.

Preferably the angle iron cross bar 14 will be engaged with the table by means of the screws 14$a$ and preferably the bar 10 will be held to the member 14 by a set screw extending upward through the member 14 and into any one of a series of sockets formed in the under face of the bar 10, the set screw being designated 10$a$. The same means of adjustment may be provided between the brace 15 and the bar 10.

The bar 10 is preferably angular in cross section as shown in Figure 3, that is, one lateral face of the bar is downwardly and inwardly inclined at an acute angle to the upper face of the bar and then is outwardly extended, thus making an angular recess 16 extending longitudinally the whole length of the bar.

Slidingly mounted upon the bar 10 are the sliding gage supports 17 and 18, these supports being substantially alike. Each of these supports is formed with a recess 19 in its under face, one wall of this recess being adapted to fit loosely the recess 16 of the bar 10, the opposite wall of this recess 19 having the set screw 20. It will thus be seen that the slides 17 and 18 can slide longitudinally upon the bar 10 but cannot rotate with relation to the bar. Each of these slides 17 and 18 is formed in its upper face with the downwardly extending socket 21. Operating in connection with these adjustable slides 17 and 18 are two work engaging members, each designated 22. These members are rectangular in cross section and at their ends adjacent the saw are formed with the downwardly extending spurs 23. The rear ends of these members are disposed within a clamp designated generally 24 comprising as illustrated the upper and lower members 25 and 26 between which are disposed the rubber clamps 27, there being rivets or bolts 28 passing through the ends of the members 25 and 26 and through the rubber clamps.

A set screw 29 extends through the uppermost member 25 of the clamp and bears against the uppermost radius bar or work engaging bar 22.

The lower member 26 of the clamp carries the downwardly projecting stud 30 terminating in a ball 31 which fits within the recess 21 in either the member 17 or the member 18 as the case may be. This provides a ball and socket joint between the clamp and the member 17 or 18, this ball constituting a pivot upon which the radius bars 22 may oscillate in carrying the work past the saw and also permitting the ends of the bars 22 to be raised or lowered freely, thus permitting the bars 22 to be readily engaged or disengaged with the work. The radius bars or work engaging bars 22 may be of any desired length and preferably a set of these members will consist of a plurality of pairs of members 22 of different lengths, one pair, for instance, being used for any radius under three feet, another set being used for any radius under seven feet and so on.

Normally there will be one pair of these members 22 for short radius work and another pair for long radius work.

In the use of this device, the work to be cut on a circle is disposed upon the table b and the elements 22 are properly adjusted to secure the proper radius for the arc to be cut. The stud 30 is inserted in one or the other of the sockets 21 and the members 17 or 18 and the spurs 23 forced into the work. Under these circumstances, if the elements 22 be now swung upon their common pivot 27, the work will be guided in the arc of a circle against the saw a and the work will be cut upon the arc of a circle without the necessity of patterns or markings.

Two slides or supporting members 17 and 18 are used so that the inner arcuate cut and the outer arcuate cut may be made without any readjustment of the parts. For instance, the outer arcuate cut is made with the stud 30 disposed in the recess 21 of the slide or support 17. These slides are so adjusted upon the bar 10 that the sockets 21 of these slides are a distance apart just equal to the width of the work, that is, the distance between the inner arcuate cut and the outer arcuate cut and thus after the outer arcuate cut has been made with the stud 31 pivotally engaged with the supporting member 17, the clamp 24 is raised and the pin 27 shifted into engagement with the socket of the supporting member 18, thus shifting the work over so that the inner arcuate cut may be made. The bars 22 can be spread apart, at their spur ends, to accommodate the length of stock to be cut, but, of course, the intersecting ends of the bars will be held properly registered with the pivot 30 by the clamp 24.

It will be noted that the members 17 and 18 fit loosely upon the supporting bar 10 but are held in any adjusted position by means of the set screws 20. The necessity for the recess 16 is to keep the members 17 or 18 vertically rigid as the strain on these is sidewise. If the bar 10 were square in cross section and the members 17 and 18 held by the set screws 20, the set screw would have to be very tight or there would be a tendency to rock or tip as the strain were placed on the members 17 or 18. When the set screw is retracted, however, the members 17 and 18 may be readily lifted off of the bar 10.

The object of the rubber cushions 27 is to hold the bars 22 in the center and yet allow them to be spread apart at the ends. This would be impossible if these parts 27 were made of metal, for instance. When the members 22 are both parallel with each other, the cushions 27 touch on both sides of the members 22 and hold them in the center and then as these members 22 are spread apart, the rubber cushions will give to allow the spread of the bars 22 but still exert a clamping action to hold them in central position which is necessary in order that the set screw 29 shall always engage the bars 22 at the exact center. By the provision of this clamping means, these radius bars 22 may be readily adjusted and held in adjusted position without the necessity of having a series of openings for a pivot pin or bolt to pass through and if a series of such recesses were used, for instance, for the screw 29, it is obvious that they could only be adjusted to a predetermined radii and could not be adjusted to make for all possible distances between the saw and the pivotal center of the radius bars.

It will also be noted from Figure 7 that the recesses 21 are disposed each closely adjacent the confronting edges of these slides 17 and 18. This permits these slides to be brought up into very close contiguity with each other and the recesses 21 to be brought up as closely as possible adjacent each other, thus allowing the two arc centers to be as close as possible which is necessary in cutting narrow pieces such as three-eighths or one-half inch circular window or door stops.

This attachment makes it unnecessary to use patterns or mark stock to be cut and enables the operator to cut much faster than can be done where a line or mark has to be followed and furthermore, there will be no variation from a proper arc, either upon the inner cut or upon the outer cut so that the work will be as nearly perfect as possible both as regards the circle cut and the width of the finished stock.

This attachment saves about one-half of the time ordinarily used for sawing stock in a circle and in actual practice has been found to save about one-fourth more finished material as well as saving the cost of patterns and the time used in making these patterns.

I claim:—

1. A work guiding attachment for band saws, comprising a supporting element adapted to extend from the table of the band saw in a horizontal plane and a pair of work engaging bars, the bars at one point crossing each other, a clamping device through which the bars pass including upper and lower members and laterally disposed elastic cushions attached to the upper and lower members and between which the bars are disposed, these cushions when the bars are parallel fitting tightly against the side faces of the bars, a screw extending downward through the upper element of the clamp and bearing against the uppermost bar, a stud extending downward from the lower element of the clamp in alinement with the set screw, and a slide mounted upon the supporting bar for adjustment therealong and having a socket within which said stud is disposed.

2. A work guiding attachment for band saws, comprising a supporting element adapted to extend from the table of the band saw in a horizontal plane and a pair of work engaging bars, the bars at one point crossing each other, a clamping device through which the bars pass including upper and lower members and laterally disposed elastic cushions attached to the upper and lower members and between which the bars are disposed, these cushions, when the bars are parallel, fitting tightly against the side faces of the bars, a screw extending downward through the upper element of the clamp and bearing against the uppermost bar, a stud extending downward from the lower element of the clamp in alinement with the screw, the stud having a ball at its lower end, a slide mounted upon the supporting bar for adjustment therealong, the slide having a socket within which said ball fits.

3. A guiding attachment for band saws comprising a supporting element adapted to extend from the table of the band saw in a horizontal plane, a pair of slides movable along said element and having means whereby they may be locked in adjusted position, the slides being adjustable with relation to each other, each of said slides having a downwardly extending socket in its upper face, the sockets being disposed closely adjacent the confronting faces of the slides, and a work engaging element disposed in a horizontal plane above the supporting member and carrying a downwardly extending stud insertible into the socket in either of said slides.

4. A band saw attachment of the character described comprising a supporting element adapted to be disposed in a horizontal plane, a member having engagement with the supporting element for adjustment along the length of the supporting element, said member being engageable with the table of a band saw, and a pair of work engaging bars pivotally mounted on a common pivot upon said supporting member for lateral swinging movement in a horizontal plane, the pivot for said bars being longitudinally adjustable upon the supporting member.

GEORGE L. PARRISH.